United States Patent [19]

Lutwyche et al.

[11] Patent Number: 5,679,952
[45] Date of Patent: Oct. 21, 1997

[54] SCANNING PROBE MICROSCOPE

[75] Inventors: Mark I. Lutwyche, Higashimatsuyama; Yasuo Wada, Tokyo, both of Japan

[73] Assignee: Hitachi, Ltd., Tokyo, Japan

[21] Appl. No.: 444,510

[22] Filed: May 19, 1995

[30] Foreign Application Priority Data

May 23, 1994 [JP] Japan ................................. 6-108123
Aug. 18, 1994 [JP] Japan ................................. 6-193968

[51] Int. Cl.$^6$ ..................................................... H01J 37/28
[52] U.S. Cl. ............................................................ 250/306
[58] Field of Search .................................. 250/306, 307; 310/309; 73/105

[56] References Cited

U.S. PATENT DOCUMENTS

| | | | |
|---|---|---|---|
| 4,992,660 | 2/1991 | Kobayashi | 250/307 |
| 5,038,034 | 8/1991 | Fujita | 250/306 |
| 5,289,408 | 2/1994 | Mimura et al. | 250/306 |
| 5,357,109 | 10/1994 | Kusumoto | 250/306 |
| 5,396,066 | 3/1995 | Ikeda et al. | 250/306 |
| 5,436,448 | 7/1995 | Hosaka et al. | 250/306 |

FOREIGN PATENT DOCUMENTS

| | | | |
|---|---|---|---|
| 2-245602 | 10/1990 | Japan | 250/306 |
| 2-297002 | 12/1990 | Japan | 250/306 |
| 3-220403 | 9/1991 | Japan | 250/306 |
| 5-175513 | 7/1993 | Japan . | |

OTHER PUBLICATIONS

J. Stroscio et al., Science, vol. 254 pp. 1319–1326 (1991) "Atomic and Molecular Manupulation with the Scanning Tunneling Microscope".

G. Binning et al., Physical Review Letters, vol. 49, No.1, pp.57–61 (1982) "Surface Studies by Scanning Tunneling Microscopy".

Y. Wada et al., J. Appl. Phys., vol. 74, No.12, pp.7321–7328, (1993) "A Proposal of Nanoscale Devices Based on Atom/Molecule Switching".

G. Meyer et al., Appl. Phys. Lett., vol.53, No.12, pp.1045–1047, (1988) "Novel Optical Approach to Atomic Force Microscopy".

Ried et al., "Piezoelectric Microphone with On–Chip CMOS Circuits", Journal of Microelectromechanical Systems, vol. 2, No. 3, Sep. 1993, pp. 111–120.

Primary Examiner—Jack I. Berman
Assistant Examiner—Kiet T. Nguyen
Attorney, Agent, or Firm—Antonelli, Terry, Stout & Kraus

[57] ABSTRACT

A plurality of scanning tunnelling microscopes and operating them at a time, a control circuit, a memory circuit and an arithmetic circuit are integrated on the same chip and movement of a movable electrode is controlled by the arithmetic circuit and control circuit on the basis of information stored in the memory circuit. An actuator utilizing electrostatic force is formed and the scanning tunnelling microscope is operated by the actuator. A plurality of movable electrodes are provided with scanning probes, respectively, and the positions of the plurality of movable electrodes relative to objects are controlled at a time.

9 Claims, 17 Drawing Sheets

FIG. 12A
FIG. 12B
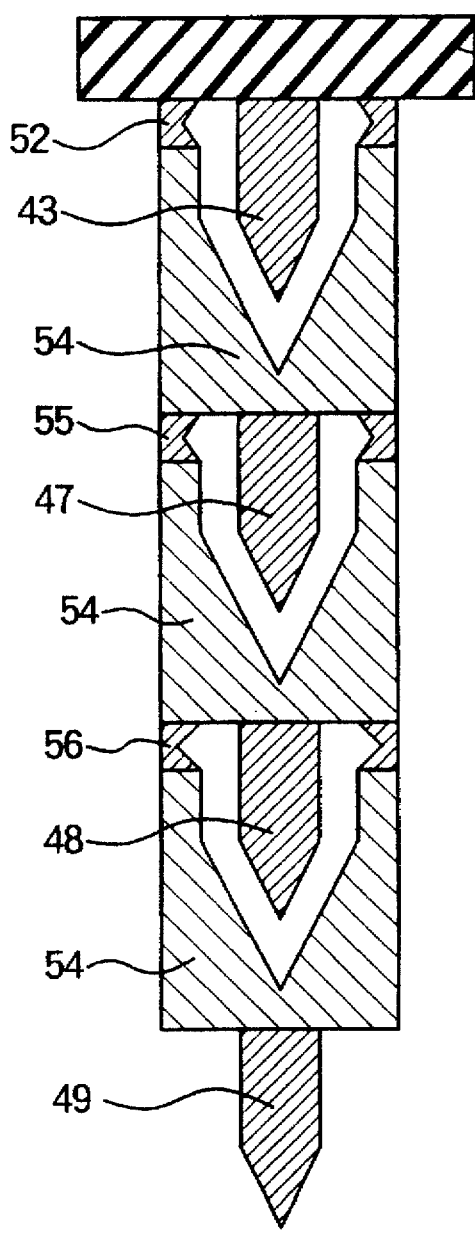
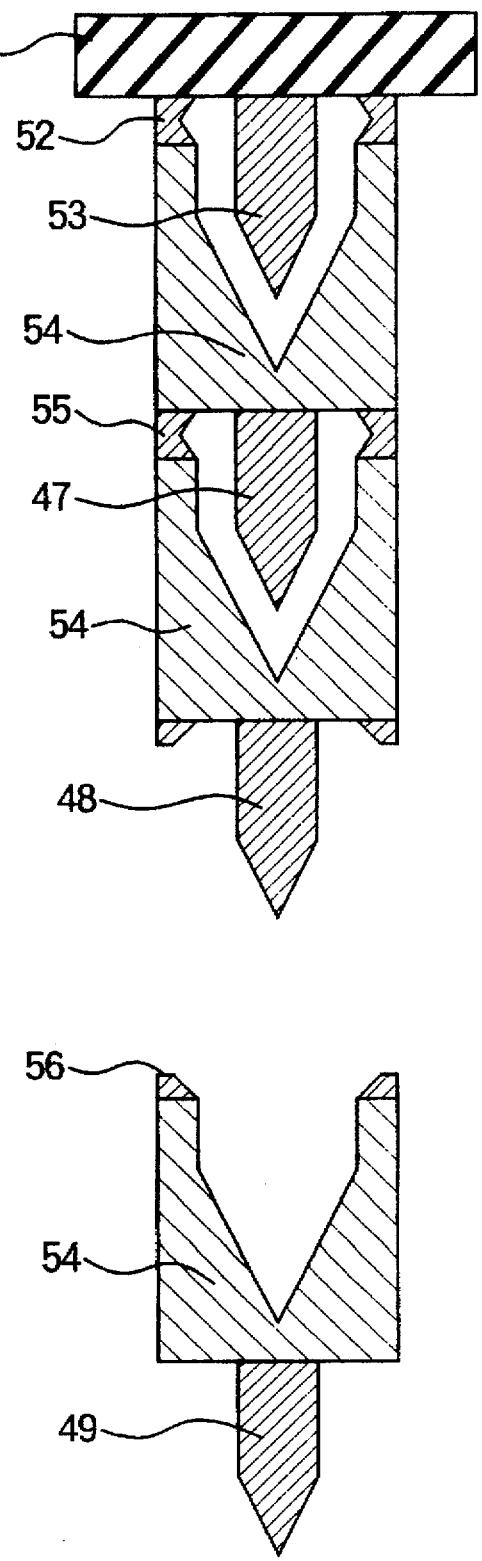

SCANNING PROBE MICROSCOPE

CROSS-REFERENCE TO RELATED APPLICATIONS

A U.S. patent application, Ser. No. 08/001250, filed on Jan. 6, 1992, entitled SURFACE OBSERVING APPARATUS AND METHOD is a related Patent Application of the present Patent Application and the contents of the above-mentioned Patent Application is incorporated herein by reference.

BACKGROUND OF THE INVENTION

The present invention relates to a scanning probe microscope (SPM) such as a scanning tunnelling microscope (STM detailed in Phys. Rev. Lett., 49, 57 (1982) by G. Binning and H. Rohrer) and an atomic force microscope (AFM).

Structurally, in a conventional STM, a probe is mounted directly to a piezoelectric ceramic device for position detection or a probe attached to a jig is mounted to a piezoelectric ceramic device. In an AFM, a probe of optical lever type is mounted to a cantilever at the time that the cantilever is formed. Specifically, in the case of STM, the probe of this type of probe microscope is generally prepared and used by sharpening the tip of a member of metal such as tungsten or platinum through mechanical process or electrolytic polishing process. In the case of AFM, a cantilever made of silicon nitride and a probe also made of silicon nitride are used and the tip of the probe is sharpened by, for example, ion irradiation.

The STM can detect atoms on the surface of a solid one by one and in addition can move an atom on the solid surface and place it at a desired location, and therefore, it is highlighted as a means for superfine work (For example, Science, 254, 1319 (1991) by J. Stroscio et al).

SUMMARY OF THE INVENTION

In the conventional STM, however, movement control means formed of one piezoelectric device is needed for one probe and disadvantageously, increases the size of the STM considerably. Accordingly, even when a subminiature structure of several of nanometers (nm) is formed by the STM on the solid surface, the subminiature structure is allowed to be arranged only at intervals of several of centimeters (cm) and integration of the structures faces difficulties.

On the other hand, an actuator has been proposed in which interdigital electrodes are formed using semiconductor techniques and voltage is applied across the electrodes to generate electrostatic force which drives the actuator. Even with this proposal, however, the device size cannot be decreased sufficiently because force exerting the electrodes is proportional to opposing areas of the electrodes and the area of the electrode per se cannot be allowed to be small. Accordingly, even through the use of the actuator as above, a subminiature integrated STM of desired size cannot be realized.

Further, in the event that a probe mounted becomes worn during measurement, the probe or, if necessary, the probe and a cantilever integral therewith must be exchanged with new ones. Therefore, in the event of damage of the probe during measurement, it is inevitable to repeat the measurement from the initial phase thereof. Furthermore, in the event that a probe used in superfine work for a switching device of atomic level (JP-A-5-175513 or for example, J. Appl. Phys., 74, 7321 (1993) by Y. Wada et al) is damaged during work, production of the atomic level device must be resumed from the initial phase and through put of efficiency of the work is degraded considerably, leading to the extremity that the final product cannot possibly be obtained.

An object of the present invention is to realize a subminiature integrated STM which was impossible to realize with the prior art.

Another object of the present invention is to permit exchange of probe in which upon exchange of a probe of a scanning probe microscope, part or the whole of a damaged probe is removed or deformed while the probe being kept to remain on the way of work by mechanical, physical, chemical or electromagnetic means so that the damaged probe may be exchanged without affecting a specimen being measured or worked.

BRIEF DESCRIPTION OF THE DRAWINGS

FIGS. 12A and 12B are diagrams showing a second embodiment according to the present invention directed to mechanical removal or deformation of part or the whole of a probe.

DESCRIPTION OF THE PREFERRED EMBODIMENTS

The present invention will now be described by way of example with reference to the accompanying drawings.

Firstly, the fundamental construction of a novel integrated scanning tunnelling microscope structure according to a first embodiment of the present invention which can realize integration of a plurality of scanning tunnelling microscopes and permit them to operate at a time.

Figure 1:
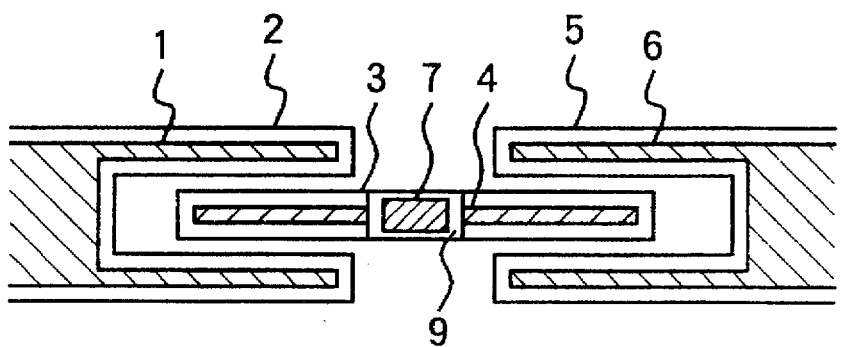
FIG. 1 is a schematic sectional diagram showing the fundamental construction of a movable electrode structure of a scanning tunnelling microscope according to a first embodiment of the present invention.

As shown in FIG. 1, an actuator is provided which has a driving part comprised of a movable electrode 4 and stationary electrodes 1 and 6 which are so formed as to surround or enclose the movable electrode 4. When constant potential is applied to the movable electrode 4 and voltage, which is positive or negative relative to the constant potential, is applied to the stationary electrode 1 or 6, the potential applied to the stationary electrode 1 or 6 exerts a force on the movable electrode 4 to move it in a direction of the stationary electrode 1 or 6.

The material of which the movable electrode 4, stationary electrodes 1 and 6 and a support beam 7 may be made of an electrically conductive material. For example, a metal or a semiconductor can be used. Especially, the use of polycrystalline silicon doped with a large amount of impurities to promote conductivity can be used.

Further, when the movable electrode 4, stationary electrodes 1 and 6 and support beam 7 are covered with insulator films 2, 3, 5 and 9, they are insulated from surroundings to exhibit excellent operating characteristics. The material which is the most suitable for the insulator films is silicon nitride but is not limited thereto. For example, silicon oxide may obviously be used. The thickness of the insulator films 2, 3, 5 and 9 can be determined in accordance with stress in the films. For example, the material is the same for upper and lower films, stress in the upper film can be equal to that in the lower film by making the thickness of the upper film equal to that of the lower film. When the material is different for the upper and lower films, it suits that the thickness is selected in such a manner that the product of stress and film thickness is substantially the same for the upper and lower films.

Figure 2:
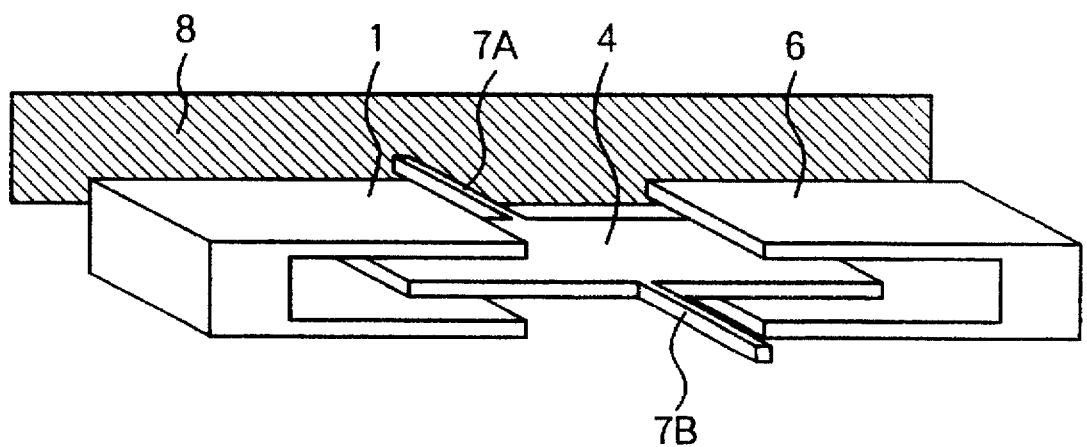
FIG. 2 is a schematic perspective view of the movable electrode structure of the scanning tunnelling microscope according to the first embodiment shown in FIG. 1.

As shown in a perspective view of FIG. 2, the movable electrode 4 has a finite width in the direction of depth and is supported at its opposite sides by support beams 7A and 7B so as to be positioned between the stationary electrodes 1 and 6. It is not always necessary that the shape of each of the support beams 7A and 7B be rectilinear but the shape may be, for example, zigzag provided that it can permit the movable electrode 4 to move in the direction of the stationary electrode 1 or 6. The support beam 7A is connected at one end to a support base 8 to ensure that the movable electrode 4 can move without contacting the stationary electrodes 1 and 6.

In FIG. 2, the connection of the frontal support beam 7B to the support base is not shown for clarity of illustration but the connection structure can be similar to that for the connection of the rear support beam 7A to the support beam 8.

Figure 3:
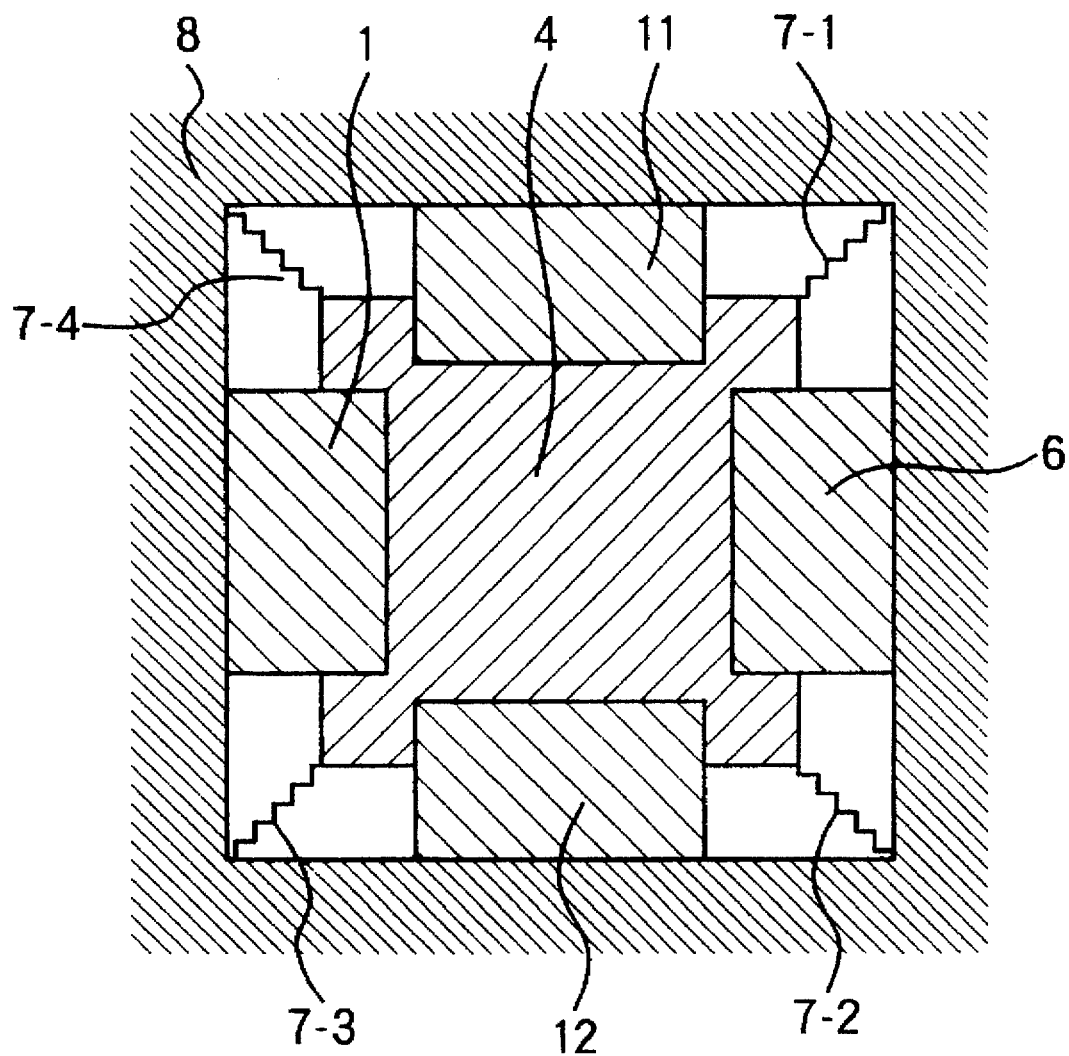
FIG. 3 is a schematic plan view showing a first embodiment of the movable electrode structure of the scanning tunnelling microscope according to the present invention.

FIG. 3 illustrates, in plan view form, the construction which is grounded on the construction shown in the sectional view of FIG. 1 and perspective view of FIG. 2 and developed to provide the ability to drive the movable electrode in two directions or x and y directions. While stationary electrodes 1 and 6 corresponding to the stationary electrodes 1 and 6 are adapted to move a movable electrode 4 in x direction, stationary electrodes 11 and 12 are adapted to move the movable electrode 4 in y direction. In the Figure, the stationary electrode is depicted as being smaller than the movable electrode but this size relation is not necessarily essential to the present invention and the movable electrode may be smaller or may be sized equally. Support beams 7-1 to 7-4 are zigzag and adapted to connect four corners of the movable electrode 4 to four inner corners of a support base 8.

With the construction shown in FIG. 3, two-dimensional movement in x and y directions on a planar plane in the Figure can be ensured. The support base 8, part of which is shown in FIG. 2, is adapted to support the whole of an integrated scanning tunnelling microscope structure as shown in FIG. 3. More particularly, the stationary electrodes 1, 6 and 11, 12 are so provided as to be held directly by the support base 8 and the movable electrode 4 is connected to the support base 8 through the beams 7-1 to 7-4 so as to be allowed for suitable movement. As will be described in later embodiments, the beams 7-1 to 7-4 and support base 8 may be made of the same material to facilitate formation thereof.

Figure 4:
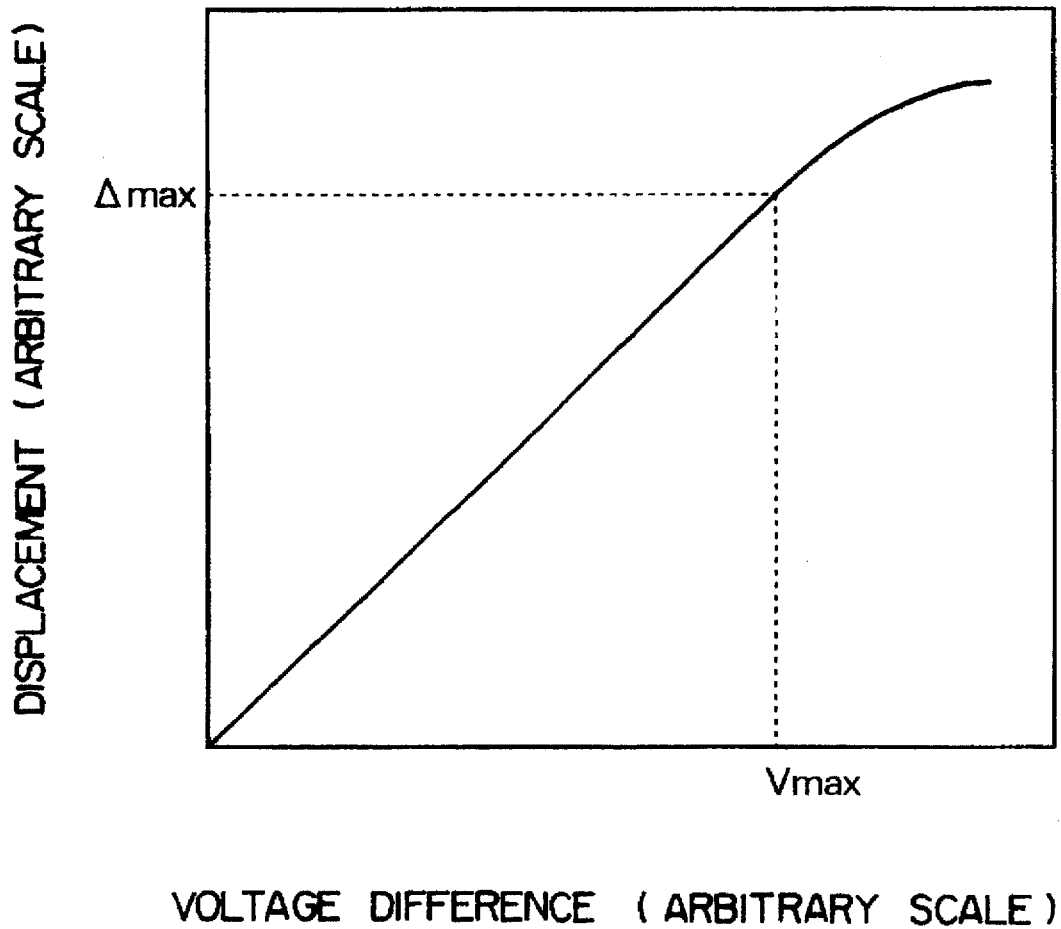
FIG. 4 is a graph showing the relation between applied voltage and displacement in the first embodiment of the movable electrode structure according to the present invention.

FIG. 4 shows the relation between voltage applied across the movable electrode 4 and each of the stationary electrodes 1 and 6 or 11 and 12 and the amount of displacement of the movable electrode. It will be appreciated that when applied voltage is smaller than maximum voltage Vmax corresponding to maximum displacement Amax, the substantially linear relation stands between applied voltage and the displacement amount. As applied voltage exceeds the maximum voltage Vmax, the linearity is lost and the displacement changes at a smaller rate than the voltage. Accordingly, with the present construction, the distance between the electrodes can be controlled accurately by applying, across the electrodes, a voltage which falls within the range below the maximum voltage Vmax.

More concrete construction of the present invention will be detailed hereunder by way of embodiments.

Embodiment 1

In the present embodiment, a method of materializing the movable electrode structure shown in FIG. 3 will be described.

Figure 5A:
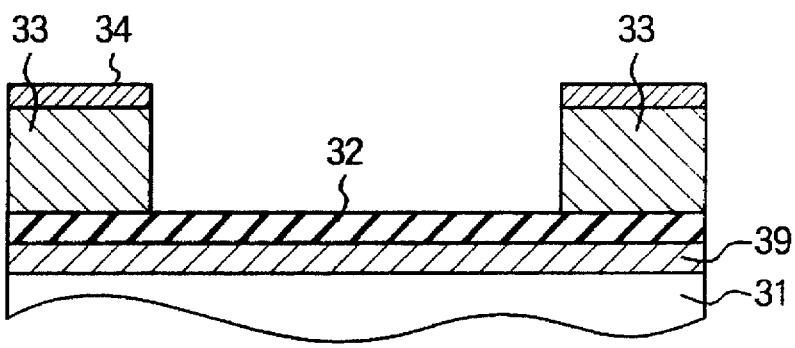
FIGS. 5A to 5D are diagrams showing a method of producing the first embodiment of the movable electrode structure according to the present invention.

FIG. 5A shows a state in which a silicon nitride film (SiN) 39 is deposited to a thickness of 100 nm on a silicon substrate 31 through chemical vapor deposition (CVD), polycrystalline silicon 32 doped with boron at $1\times10^{20}/cm^3$ is then deposited to a thickness of 500 nm through CVD process, a polycrystalline silicon layer 33 similarly doped with boron at $1\times10^{20}/cm^3$ and 100 nm thick silicon nitride 34 are thereafter deposited, and a resulting structure is patterned. The bottom surface of the silicon substrate 31 is not illustrated.

Figure 5B:
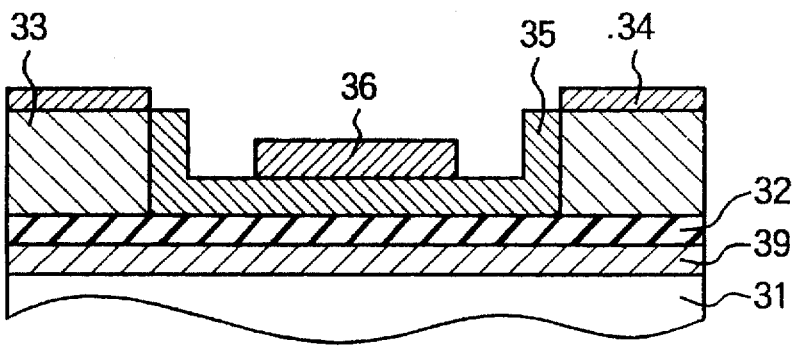

FIG. 5B shows a state in which the above structure is oxidized to cause a thermal oxidized film 35 to grow to a thickness of 200 nm, polycrystalline silicon 36 doped with boron at $1\times10^{20}/cm^3$ to a thickness of 500 nm is again deposited, and a resulting structure is subsequently patterned.

Figure 5C:
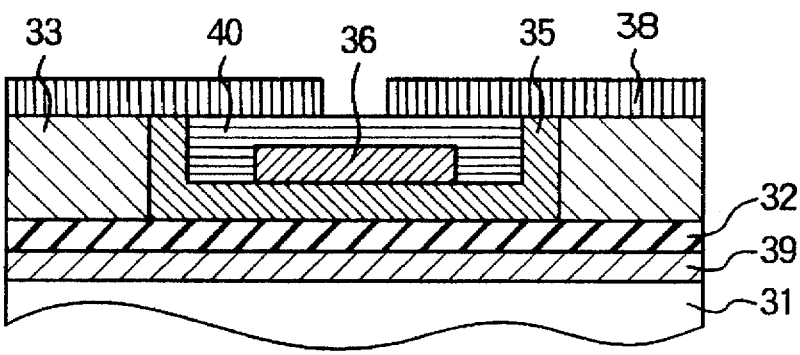

FIG. 5C shows a state in which an oxidized film ($SiO_2$) 40 is deposited through CVD process and flattened, thereafter polycrystalline silicon 38 doped with boron at $1\times10^{20}/cm^3$ is again deposited, and a resulting structure is patterned.

Figure 5D:
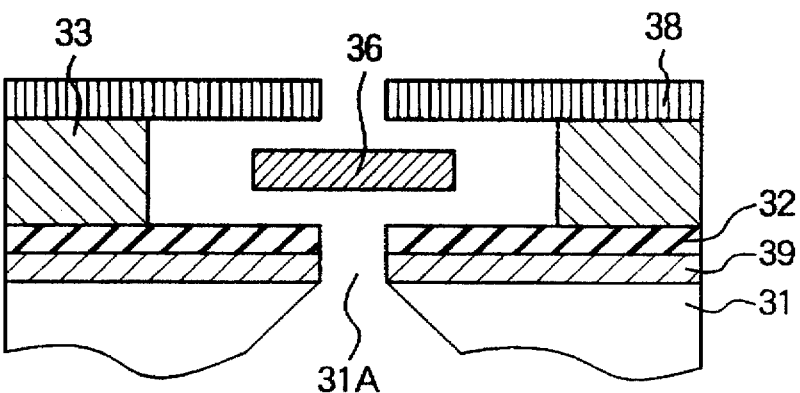

FIG. 5D shows a state in which the silicon substrate 31 is anisotropically etched from the back surface thereof with a potassium hydroxide (KOH) aqueous solution heated to 100° C. to open a window 31A, the SiN 39 and polycrystalline silicon 32 are removed at their exposed portions in accordance with the opening 31A through dry etching process using a reactive gas containing fluorine as a base and further, the silicon oxidized films 35 and 40 are removed with hydrofluoric acid (HF) to complete a structure.

In this manner, the movable electrode made of the polycrystalline silicon 36 and the stationary electrodes each made of the polycrystalline silicon layers 32, 33 and 38 can be formed. Upon formation of these electrodes, it is possible to materialize a structure in which the exposed surface of each of the polycrystalline layers 32, 33, 36 and 38 is covered with a SiN film so as to be protected.

More specifically, with the protective covering film, the polycrystalline silicon layer surface which is treated under a very violent condition when it is anisotropically etched with a KOH aqueous solution can be protected and consequently, a stable structure can be formed. The film thickness condition in this case is determined in accordance with stress in the film as described previously but when the same material is used for the upper and lower insulator films, it is suitable that the thickness is the same for the upper and lower films. However, when registration tolerance is given in consideration of accuracy of masking registration during treatment, the final thickness must be the same for the upper and lower films. More particularly, when the width of the beam is 1 μm, the registration tolerance is 0.25 μm, the thickness of the lower film is 1 and the thickness of the upper film is t, $$1\times1+0.25\times2\times(t+1)=t$$

$$\therefore t=3$$

stands because stress is the same for upper and lower films. Therefore, the ratio between thicknesses of the upper and lower films is desired to be 3:1. Practically, since relaxation due to stress in the intermediate polycrystalline silicon layer has relation to the thickness, the ratio between thicknesses of the upper and lower films which falls within the range of from about 1.5:1 to about 4:1 can be selected.

Embodiment 2

Figure 6:
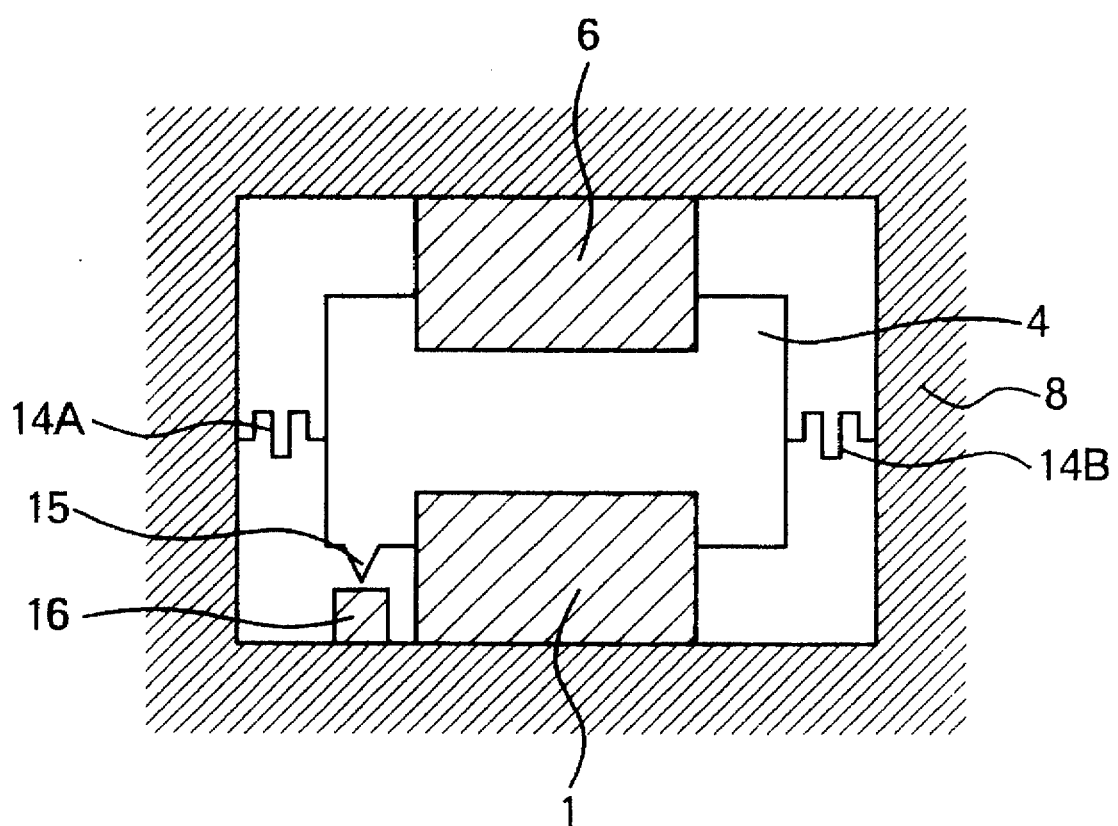
FIG. 6 is a schematic plan view of a one-dimensional STM using the movable electrode structure according to the first embodiment of the present invention.

In the present embodiment, the construction of a one-dimensional STM using the previously-described movable electrode structure will be described. FIG. 6 shows a construction in which a movable electrode 4, stationary electrodes 1 and 6, support beams 14A and 14B, and a support base 8 connected with the support beams 14A and 14B are provided, wherein a probe 15, on the one hand, is mounted to the movable electrode 4 and a specimen 16, on the other hand, is provided on the side of the stationary electrode 1. The probe 15 is electrically insulated from the movable electrode 4, the specimen 16 is electrically insulated from the stationary electrode 1, potential is applied to the movable electrode 4 through the beam 14B, and probe current is supplied through the beam 14A. With this construction, by controlling voltage applied across the movable electrode 4 and stationary electrode 1 or 6 such that tunnelling current flowing between the probe 15 and specimen 16 can be constant, STM operation can be realized. This construction permits the distance between the probe and specimen to be controlled with an accuracy of 0.01 nm or less and a subminiature distance control apparatus can be realized.

Each of the support beams 14A and 14B is not necessarily single but a plurality of support beams may be mounted in place of each support beam 14A or 14B. The probe 15 and specimen 16 may be formed simultaneously with the formation of the movable electrode. The tip end of the probe can be sharpened sufficiently by lithography techniques.

Embodiment 3

In the present embodiment, the construction of a two-dimensional STM using the previously-described movable electrode structure will be described.

Figure 7:
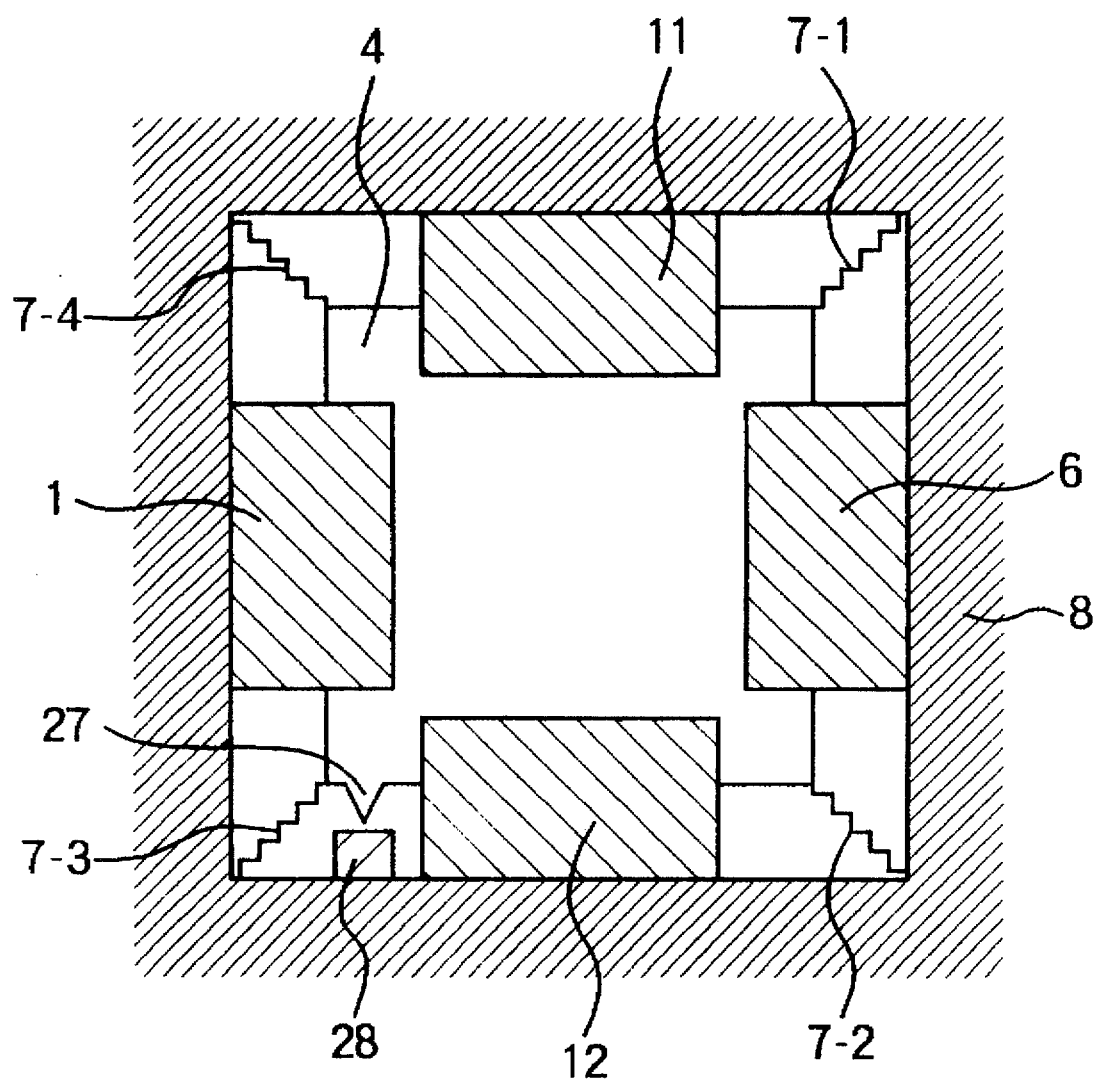
FIG. 7 is a schematic plan view of a two-dimensional STM using the movable electrode structure according to the first embodiment of the present invention.

FIG. 7 shows a construction in which a movable electrode 4, stationary electrodes 1, 6, 11 and 12, beams 7-1 to 7-4 and a support base 8 are provided, wherein a probe 27, on the one hand, is formed on the movable electrode 4 and a specimen 28, on the other hand, is formed on the side of the stationary electrode. While movement in a direction of one axis can be controlled with an accuracy of 0.01 nm or less by means of the stationary electrodes 1 and 6, the distance between the probe and specimen can be controlled similarly with an accuracy of 0.01 nm or less by means of stationary electrodes 11 and 12.

Embodiment 4

In the present embodiment, the construction of a three-dimensional STM using the previously-described movable electrode structure will be described.

Figure 8:
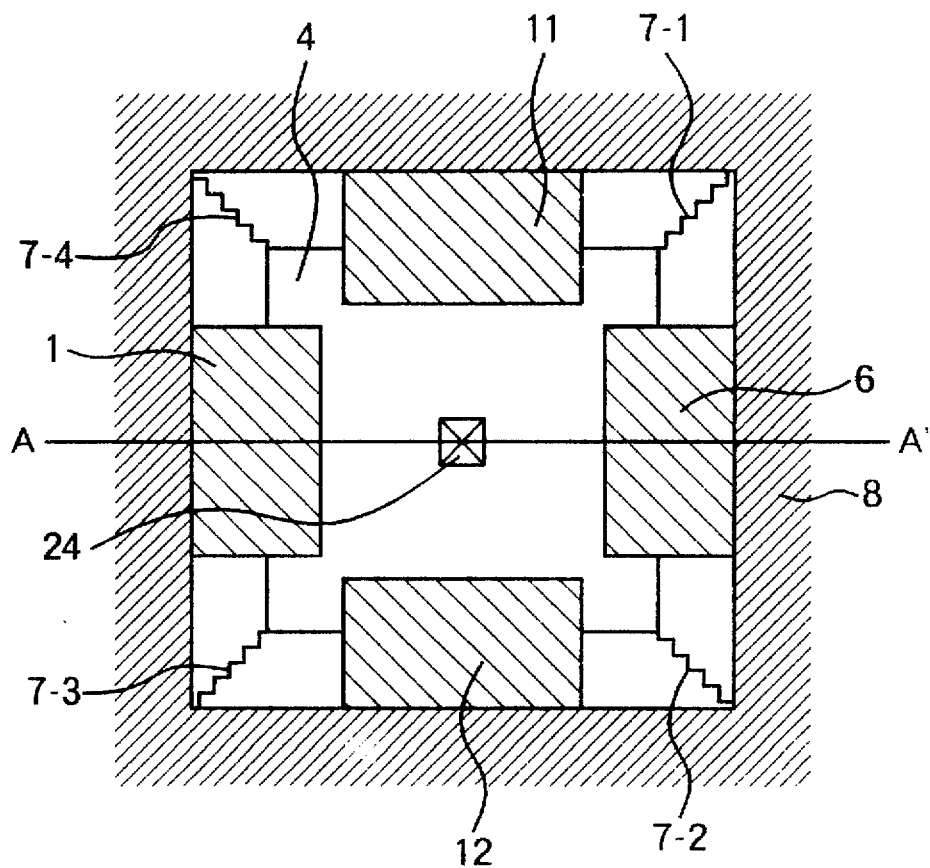
FIG. 8 is a schematic plan view of a three-dimensional STM using the movable electrode structure according to the first embodiment of the present invention.

FIG. 8 shows a construction in which a movable electrode 4, stationary electrodes 11, 6, 1 and 12, support beams 7-1, 7-2, 7-3 and 7-4 and a support base 8 are provided, wherein a probe 24 is formed on the movable electrode 4. While movement in a direction of one axis, for example, X axis can be controlled with an accuracy of 0.01 nm or less by means of the stationary electrodes 1 and 6, movement in the other axis direction, for example, Y axis can be controlled similarly with an accuracy of 0.01 nm or less by means of the stationary electrodes 11 and 12. Movement in Z-axis direction can be controlled by a piezoelectric device provided in a direction vertical to the sheet of drawing. The probe 24 can be formed by, for example, depositing a gaseous material such as tungsten fluoride through electron beam exciting process.

Figure 9:
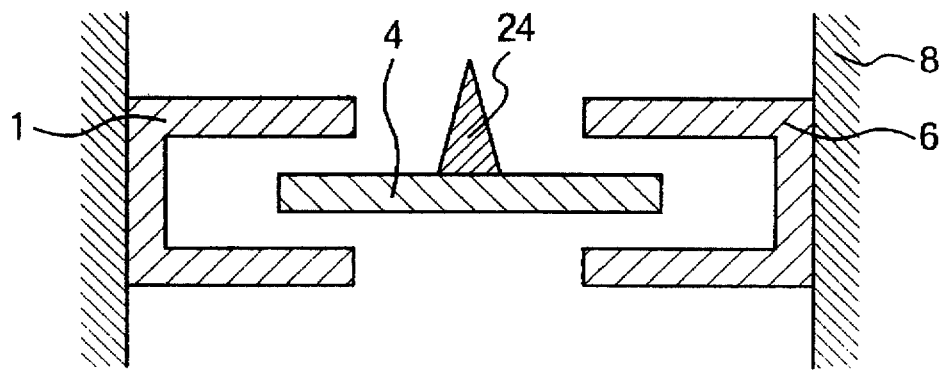
FIG. 9 is a schematic sectional view of the three-dimensional STM using the movable electrode structure according to the first embodiment of the present invention.

A section on A–A' shown in FIG. 8 is depicted in FIG. 9. In the construction having the movable electrode 4, stationary electrodes 1 and 6, support base 8 and probe 24, the position of the movable electrode 4 carrying the probe 24 can be controlled on X-Y plane with an accuracy of 0.01 nm or less by means of the stationary electrodes 1 and 6. The position of the whole of this construction can be controlled accurately in Z-axis direction by means of a piezoelectric device (not shown). In the present embodiment, in order to realize the three-dimensional STM, the accurate position control method according to the present invention is used for two axes and the conventional position control method based on the piezoelectric device is used for one axis but the accurate position control method according to the present invention may obviously be used for one axis or three axes.

Embodiment 5

In the present embodiment, a control unit integrated STM will be described in which a control unit is integrated on the three-dimensional STM using the previously-described movable electrode structure.

Figure 10:
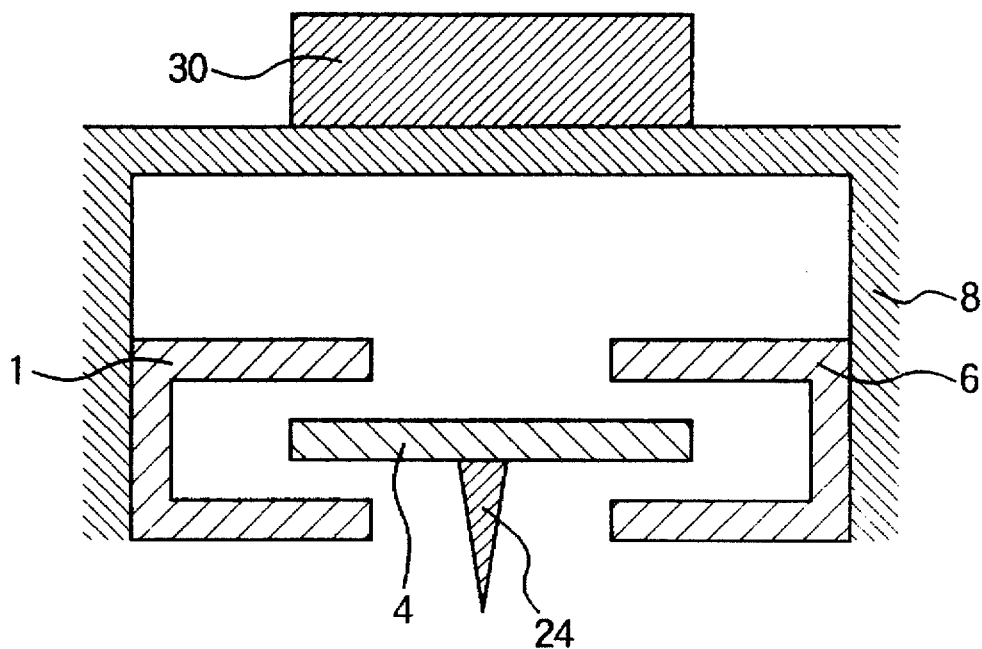
FIG. 10 is a schematic sectional view of a three-dimensional control unit integrated STM using the movable electrode structure according to the first embodiment of the present invention.

FIG. 10 shows a control unit integrated STM 40 having a control unit 30 on the three-dimensional STM described with reference to FIGS. 8 and 9. In the present embodiment, two-dimensional movement of the movable electrode 1 and probe 24 can be controlled by the stationary electrodes 1 and 6 under the control of the control unit 30. Namely, the control unit 30 may be provided with not only the fundamental control function necessary for operation of the STM such as a function of controlling movement in Z-axis direction such that tunnelling current flowing between the probe 24 and a specimen (not shown) and a function of detecting and controlling two-dimensional movement of the probe 24 but also probe position control information necessary for permitting desired movement of the probe. Accordingly, when forming a predetermined configuration on the surface of a solid, the predetermined configuration can be formed automatically by using the control unit 30 which has precedently been stored with position information and the like.

Embodiment 6

Figure 11:
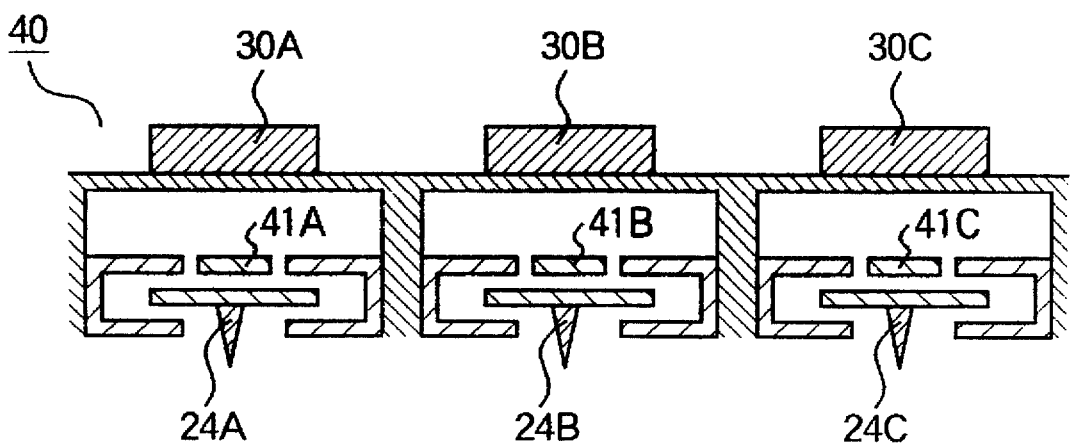
FIG. 11 is a schematic sectional view of a parallel STM in which a plurality of three-dimensional control unit integrated STM's each using the movable electrode structure according to the first embodiment of the present invention are arranged in parallel.

In the present embodiment, a parallel STM structure will be described in which a plurality of three-dimensional control unit integrated STM's 40 each using the novel movable electrode structure are arranged side by side. FIG. 11 shows the concept of the parallel STM in which a plurality of three-dimensional control unit integrated STM's 40 as shown in FIG. 10 are arranged side by side. In the parallel STM structure, control units 30 can take the form of separate circuits which are formed on different chips but generally, formation of control units on the same substrate as that for the integrated STM can obviously be more advantageous from the viewpoint of performance and cost.

In the present embodiment, the parallel STM is realized by forming the novel movable electrode structure by the method described in connection with embodiment 1 to realize the three-dimensional STM on a silicon substrate and thereafter, a control circuit formed of CMOS's are formed on the silicon substrate through ordinary CMOS process. Needless to say, the parallel STM can obviously be realized by forming the control circuit formed of CMOS's on the silicon substrate and thereafter preparing the three-dimensional STM having the novel movable electrode structure.

With the parallel STM of FIG. 11, a desired configuration can be formed by precisely controlling the movement of each probe 24A, 24B or 24C by means of each control unit 30A, 30B or 30C. In this case, the probes 24A, 24B and 24C are controlled independently one by one by memory information from the control units 30A, 30B and 30C which are written with different kinds of information, respectively, but alternatively, the plurality of probes may be operated in interdependent relationship and the respective probes may share individual parts of the configuration formation so that the probes as a whole may form a predetermined configuration. In the parallel STM exemplified in the present embodiment, three three-dimensional control unit integrated STM's 40 are arranged in parallel but the number of STM's is not essential to the present invention and, for example, 100 STM's may be arranged in parallel. Instead of the one-dimensional arrangement, a two-dimensional arrangement may be adopted. For example, of 100 three-dimensional control unit integrated STM's 40, 10 STM's can be arranged in the longitudinal direction and 10 STM's can be arranged in the transverse direction.

In this case, it is not suitable that Z-axis movement as exemplified in FIGS. 8 and 9 is effected in all of the STM's at a time. The individual probes 24A, 24B and 24C are moved independently in Z-axis direction by means of electrodes 41A, 41B and 41C for applying an electric field in Z-axis direction which are provided independently and driven independently by controlling potential applied to the respective electrodes. The electrodes can be realized through a similar process to that for the movable electrode structure described in connection with FIG. 5 and will not be described specifically herein.

Other embodiments of the present invention contrived to provide measures against breakage of a probe in the scanning probe microscope according to the present invention are grounded on various methods including moving a probe in use to a known location when the probe initially used is broken or keeping the location of a probe unchanged and then (1) mechanically removing or deforming a part or the whole of the probe, (2) electromagnetically deforming a part or the whole of the probe, (3) chemically removing or deforming a part or the whole of the probe and (4) physically removing or deforming a part or the whole of the probe, so that a separately prepared probe may be allowed to be used or the probe being presently used may recover its usability to thereby ensure that measurement of an atomic level and preparation of an atomic level device can be resumed from substantially the same location and phase.

The above will now be described more specifically.

Embodiment 7

In the present embodiment, an instance will be described wherein a part or the whole of a probe is mechanically removed or deformed.

More particularly, as shown in FIG. 12A, a cascade connection of a plurality of probes 43, 47, 48 and 49 is connected to a movable electrode 4. The probe 43 is connected directly to the movable electrode 4, the other probes are held by support structures 54, respectively, and the individual support structures 54 are held through breakable portions 52, 55 and 56. Each support structure and each breakable portion have of course electrical conductivity. The probes connected in cascade are used integrally as a single probe and when it is determined that the tip probe 49 is worn or the tip end is broken, the probe 49 used as the tip probe is broken at the breakable portion 56 so as to be removed together with the support structure 54, thereby placing the fresh probe 48 in usable condition. Mechanical breaking forces necessary for breakage of the breakable portions 52, 55 and 56, as designated by 52, 55 and 56, respectively, are related to each other as below

52>55>56 so that the probes 49, 48, 47 and 43 may be used in this order. Used as a mechanical breaking unit necessary for breakage of the breakable portions 52, 55 and 56 is a manipulator (not shown) having one end fixed to the main body of the probe microscope. Since the mechanical breaking force for the breakable portion 56 of the tip probe is the smallest as described above, the tip probe can be removed with ease as shown in FIG. 12B by gripping the tip support 54 and applying thereto a torsional force.

Another embodiment will be described in which part or the whole of a probe is mechanically removed or deformed.

Figure 13A:
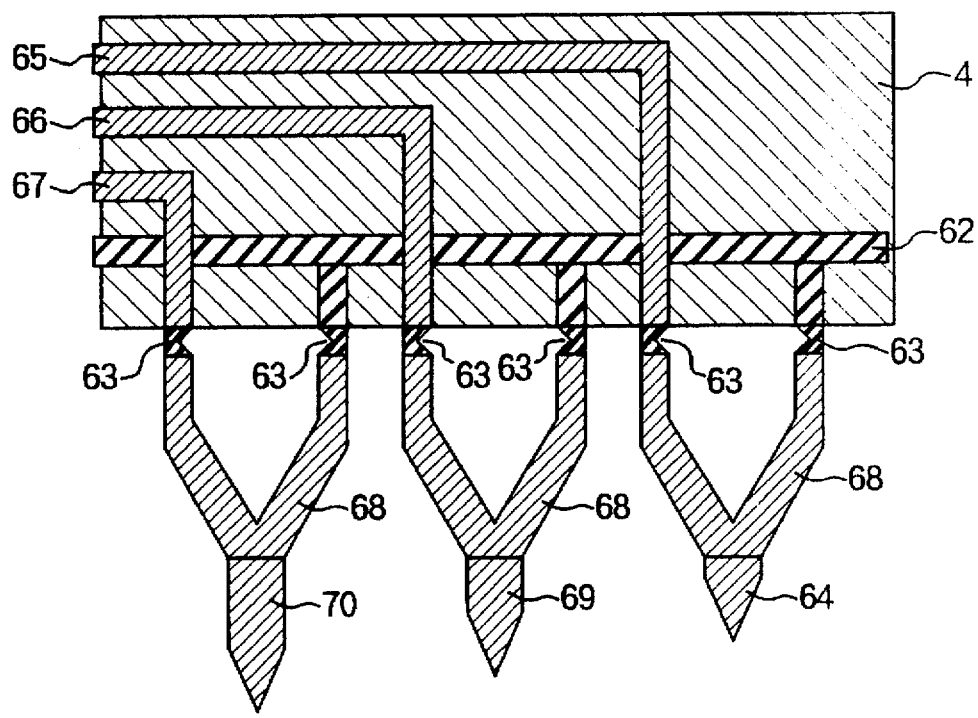
FIGS. 13A and 13B are diagrams showing a third embodiment according to the present invention directed to mechanical removal or deformation of part or the whole of a probe.

More particularly, as shown in FIG. 13A, probes 64, 69 and 70 arranged in parallel are mounted to a movable electrode 4. The probes 64, 69 and 70 are formed at tip ends of support structures 68, respectively. Each support structure 68 is connected to the movable electrode 4 through a breakable portion 63. The movable electrode 4 is electrically insulating and has wiring lines 65, 66 and 67 which are laid in the movable electrode and connected to the probes 64, 69 and 70, respectively, and a common wiring line 62 which is also laid in the movable electrode and connected in common to the individual probes. By using these wiring lines, current of the STM can be detected. The independent wiring lines 65, 66 and 67 are not always necessary and the provision of only the common wiring line may suffice. In an application to the STM, like FIG. 12, the movable electrode may be electrically conductive and removed of the wiring lines.

Longitudinal sizes (lengths) of the probes 64, 69 and 70, as designated by 64, 69 and 70, respectively, are related to each other as below

Figure 13B:
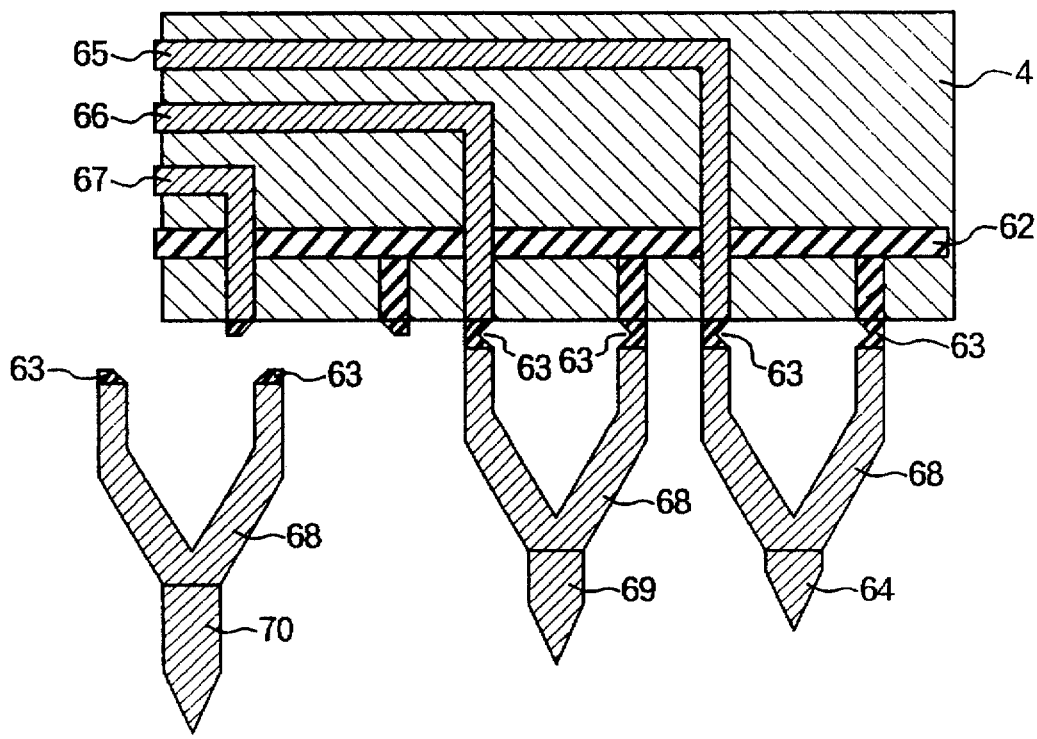

70>69>64 and the probe is used in order of size. In the event that the probe 70 is damaged, it is separated at the breakable portion 63 as shown in FIG. 13B and the probe 69 is ready for use. The probes are arranged at known intervals and, for example, in the event that the probe 70 becomes unusable while the surface is observed using the probe 70, the probe 70 is separated and the surface portion under observation is moved to directly below the probe 69 or the movable electrode 4 per se is moved by correcting the movement by a distance between the probes 70 and 69.

Still another embodiment will be described in which part or the whole of a probe is mechanically removed or deformed.

Figure 14A:
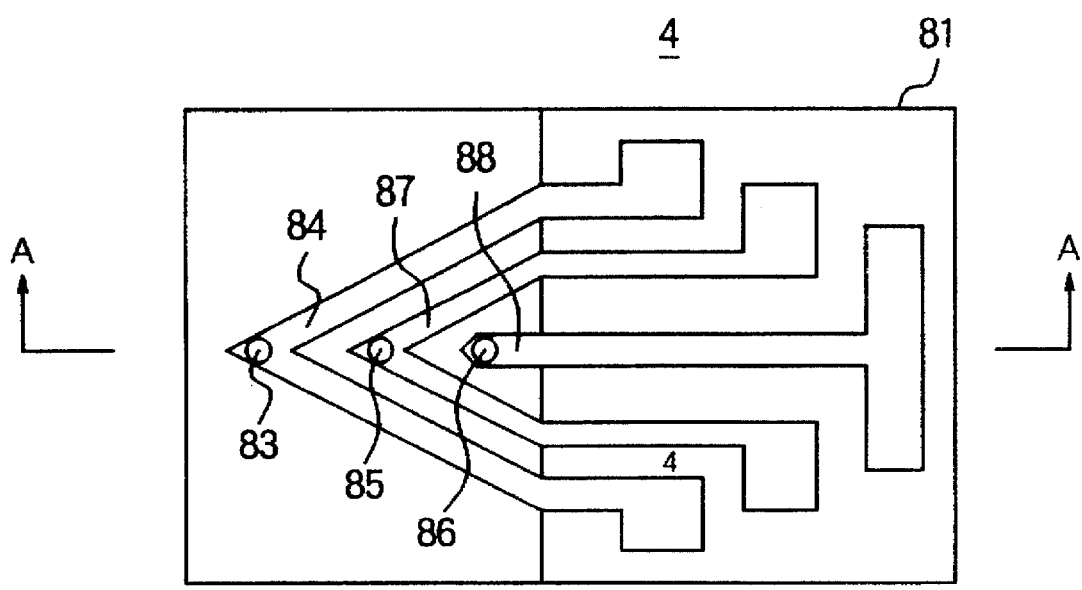
FIGS. 14A and 14B are diagrams showing a fourth embodiment according to the present invention directed to mechanical removal or deformation of part or the whole of a probe.
Figure 14B:
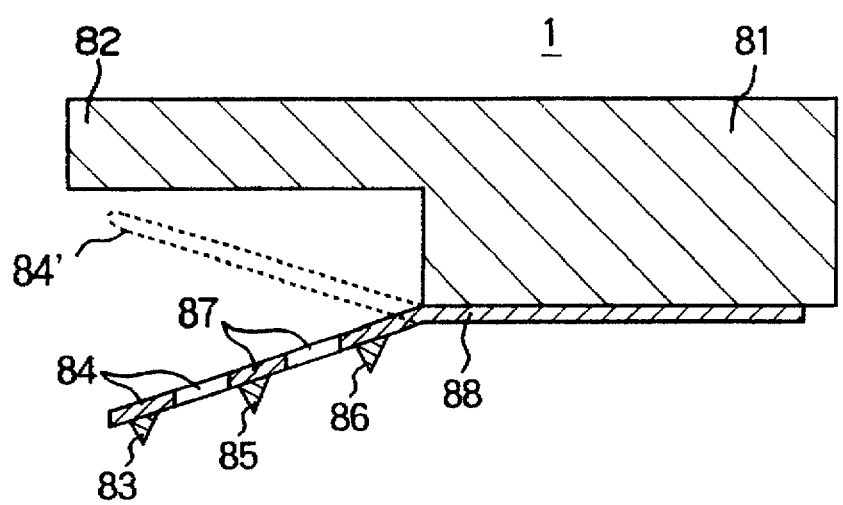

More particularly, as shown in a plan view of FIG. 14A and in a sectional view of FIG. 14B on A—A of FIG. 14A, a movable electrode 4 has a sectional form of a stepped planar plate and cantilevers 84, 87 and 88 having probes 83, 85 and 86 are held on a base 81 of the movable electrode 4. A base of each cantilever laid on the base 81 of movable electrode 4 on which the respective cantilevers are held also plays the role of a lead wiring line for delivery of a signal.

In the initial state, the probe 83 is usable but in the event that the probe 83 is damaged, the cantilever 84 is bent toward a tip portion 82 of the movable electrode 4 as shown at dotted line 84' in FIG. 14B. As a result, the probe 85 becomes usable. Since the distance between probe and electrode 4 is predetermined in correspondence to a probe in use, movement is corrected by this distance to ensure that measurement of an atomic level and preparation of an atomic level device can be resumed with the SPM substantially continuously from substantially the same location. In the present embodiment, a triadic probe structure is described but the number of probes can of course be increased as necessary. The exemplified structure is for explanation only and is in no way limitative. The essence of the present embodiment resides in that a plurality of probes are prepared and they are used sequentially.

Next, a still another embodiment will be described in which part or the whole of a probe is chemically or physically removed or deformed to permit exchange of a plurality of probes. In the present embodiment, since the movable electrode has no relation to the structure characteristic of the present embodiment, only the probe structure will be described.

Figure 15A:
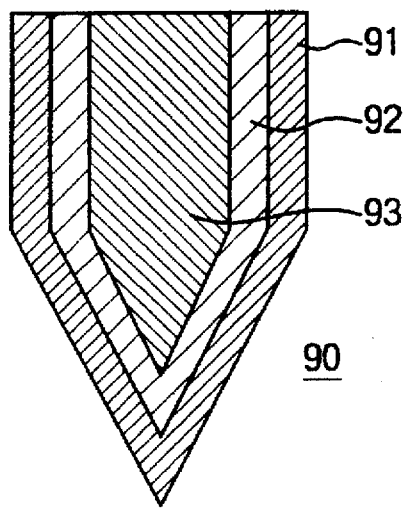
FIGS. 15A to 15D are diagrams showing a fifth embodiment according to the present invention directed to physical or chemical removal or deformation of part or the whole of a probe.

More particularly, as shown in FIG. 15A, a probe 90 has a structure of multiple layers 91, 92 and 93 and the outermost layer 91 is used as a tip probe.

Figure 15B:
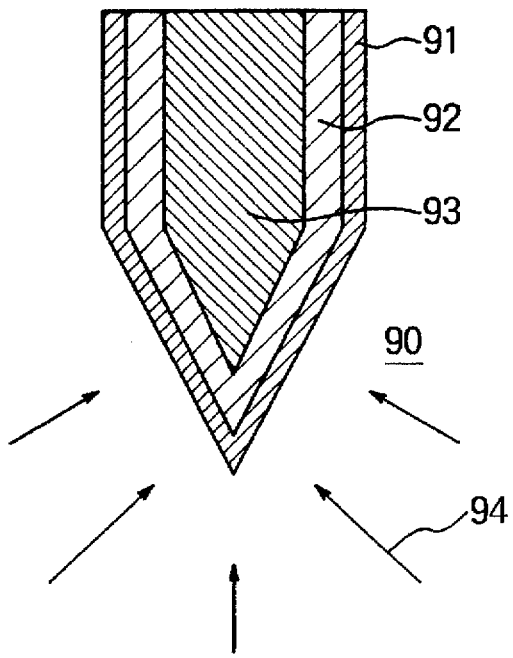

In the event that the outermost layer 91 is damaged, a reactive beam 94 for chemically removing the outermost layer 91 or an ion beam 94 for physically removing the outermost layer 91 is irradiated as shown in FIG. 15B to remove the outermost layer 91. The amount of removal is determined in accordance with a damaged state of the outermost layer 91, so that the whole or only part of the outermost layer can be removed. For example, the outermost layer 91 is made of silicon, an active chlorine chemical beam or an argon ion beam can be used.

Figure 15C:
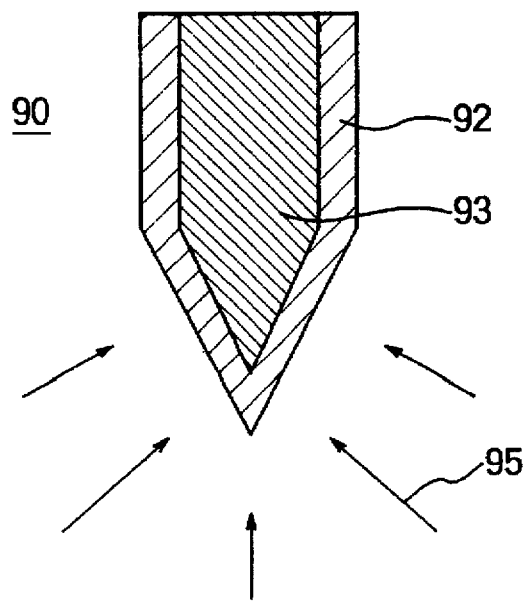

In the event that the second layer 92 is damaged while the SPM using the second layer 92 operates to measure an atomic level or prepare an atomic level device, an reactive beam 95 for chemically removing the second layer 92 or an ion beam 95 for physically removing the second layer 92 is irradiated as shown in FIG. 15C to remove the second layer 92. For example, the second layer is made of tungsten, an active fluorine chemical beam or an argon ion beam can be used.

Obviously, in the chemical removing method as above, chemically selective removal is possible but in the physical removal, on the other hand, selectivity is low and therefore the chemical and physical methods can be used in combination or a highly selective, high-speed etching method such as reactive ion etching can be used to materialize a necessary configuration.

Figure 15D:
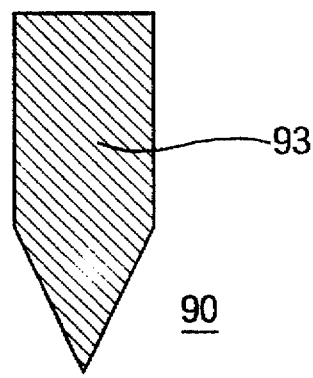

FIG. 15D shows a state in which the third layer 93 made of, for example, gold is exposed following removal of the second layer 92 made of, for example, tungsten.

In the present embodiment, the three-layer structure is described but the number of layers can of course be increased as necessary. In the present embodiment, the probe 90 is described as being made of a combinational material of silicon, tungsten and gold but the material is not limited thereto provided that it is a combinational material of elements which are selectively removable from each other. A non-conductive material can be used for an AFM probe and in general, a material usable for the SPM probe can be used for the AFM probe. Through the aforementioned process, even when the probe is damaged, measurement of an atomic level and preparation of an atomic level device can be resumed with the SPM substantially continuously from substantially the same location.

Still another embodiment will be described in which part or the whole of a probe is chemically or physically removed or deformed in order that the tip of the probe is again sharpened to permit the same probe to recover its usability.

Figure 16:
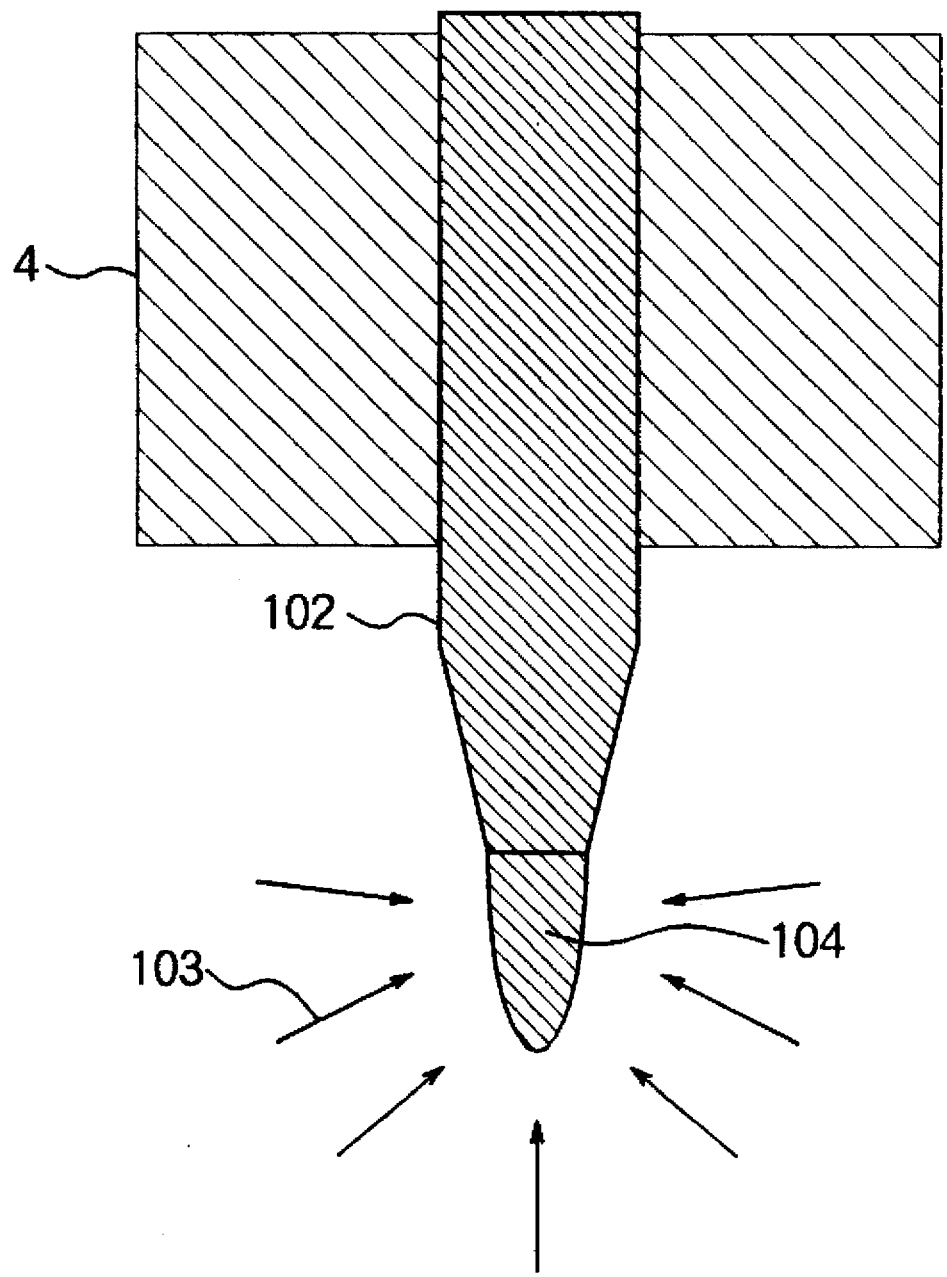
FIG. 16 is a diagram showing a sixth embodiment according to the present invention directed to physical or chemical removal or deformation of part or the whole of a probe.

More particularly, in the event that the tip of a probe 102 is damaged in a structure consisting of a movable electrode 4 and the probe 102, an reactive beam 103 for chemically sharpening a tip end 104 of the probe or an ion beam 103 for physically sharpening the tip end 104 of the probe is irradiated as shown in FIG. 16 to work the probe tip end 104 into a reusable form. Through the above process, even when the probe is damaged, measurement of an atomic level and preparation of an atomic level device can be resumed with the scanning probe microscope substantially continuously from substantially the same location.

Still another embodiment will be described in which part of a damaged probe is chemically deformed in order that the probe tip is again sharpened to permit the same probe to recover its usability.

Figure 17A:
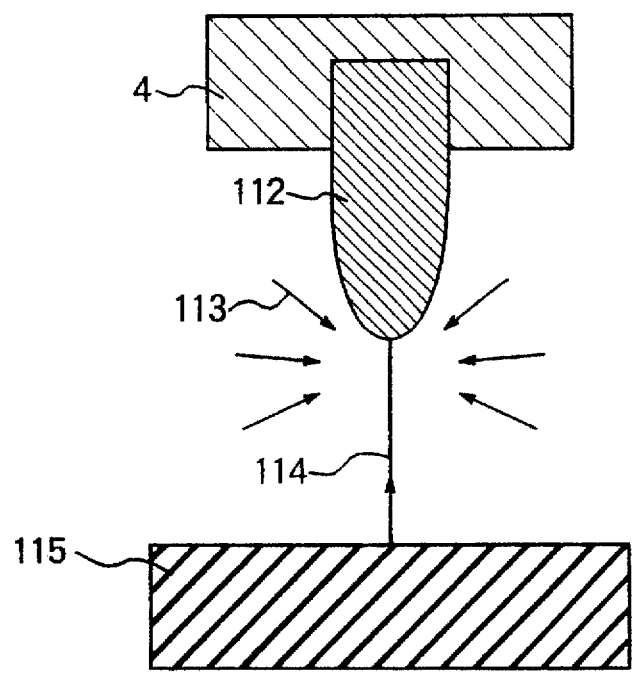
FIGS. 17A and 17B are diagrams showing a seventh embodiment according to the present invention directed to chemical deformation of part of a probe.
Figure 17B:
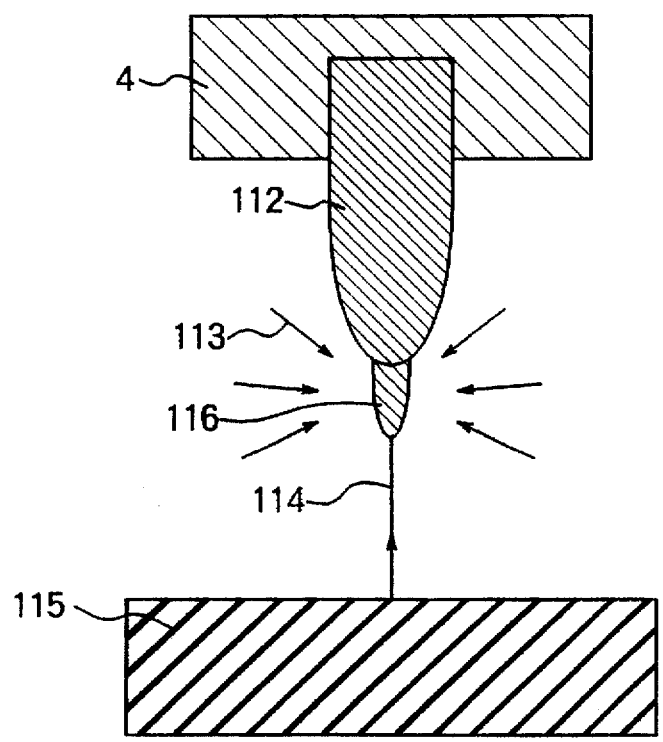

More particularly, in the event that a tip portion of a probe 112 is damaged in a structure consisting of a movable electrode 4 and the probe 112, a reactive gas 113 is flowed around the probe 112 while passing tunnelling current 114 between the probe 112 and a specimen 115 as shown in FIG. 17A. In the present embodiment, when tungsten is used for the probe 112 and tunnelling current 114 is passed between the specimen 115 and probe 112 while flowing an reactive gas of tungsten hexafluoride, a fresh tip portion 116 of the probe grows as shown in FIG. 17B and this portion can be used as probe.

The fresh probe tip portion can be allowed to grow at a position which is spaced apart by a predetermined distance from a site where measurement of an atomic level and preparation of an atomic level device are carried out, so as to have no influence on a specimen being measured or prepared at present.

Through the above process, even when the probe is damaged, measurement of an atomic level and preparation of an atomic level device can be resumed with the scanning probe microscope substantially continuously from substantially the same location.

Next, a probe structure will be described in which a part or the whole of a probe is deformed or deflected electromagnetically in order that the scanning probe microscope can be allowed to resume measurement of an atomic level and preparation of an atomic level device substantially continuously from substantially the same location even when the tip of a probe is damaged during the use of the probe.

Figure 18A:
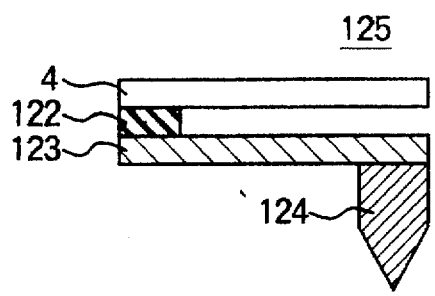
FIGS. 18A to 18D are diagrams showing an eighth embodiment according to the present invention directed to electromagnetic deformation of part or the whole of a probe.
Figure 18B:
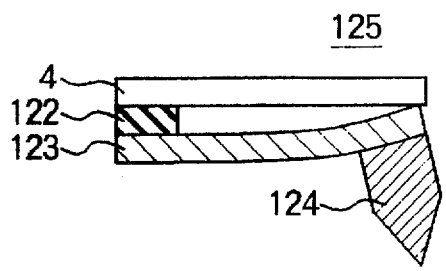

FIG. 18A shows a probe assembly 125 comprised of a movable electrode 4, an inter-electrode insulator member 122, a probe support cantilever 123 and a probe 124. In the probe assembly 125 as above, when voltage is applied between the movable electrode 4 and the probe support cantilever 123, attractive force is generated therebetween and the probe 124 is deflected upwards as shown in FIG. 18B.

Figure 18C:
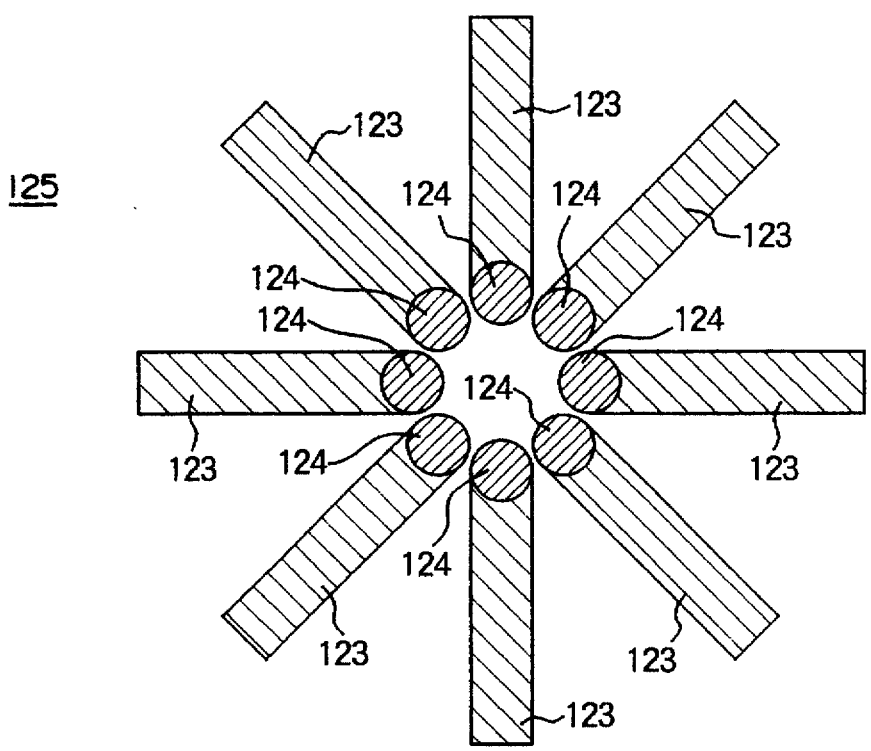
Figure 18D:
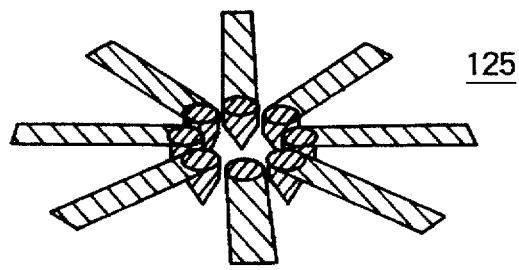

In the present embodiment, the movable electrode 4 is an electrical conductor made of silicon, the probe support cantilever 123 is formed of a polycrystalline silicon film sandwiched by silicon nitride films, and the probe 124 is made of tungsten. By applying a voltage of about 10V across the movable electrode 4 and the probe support cantilever 123, the probe 124 can be deflected upwards sufficiently. FIG. 18C shows a state in which a plurality of probe assemblies 125 each having the above construction are arranged at predetermined locations to form a probe assembly group. The whole of the arrangement is seen as shown in perspective view form in FIG. 18D (with the movable electrode 4 removed). Alternatively, probe assemblies may be arranged in parallel to each other.

Figure 19:
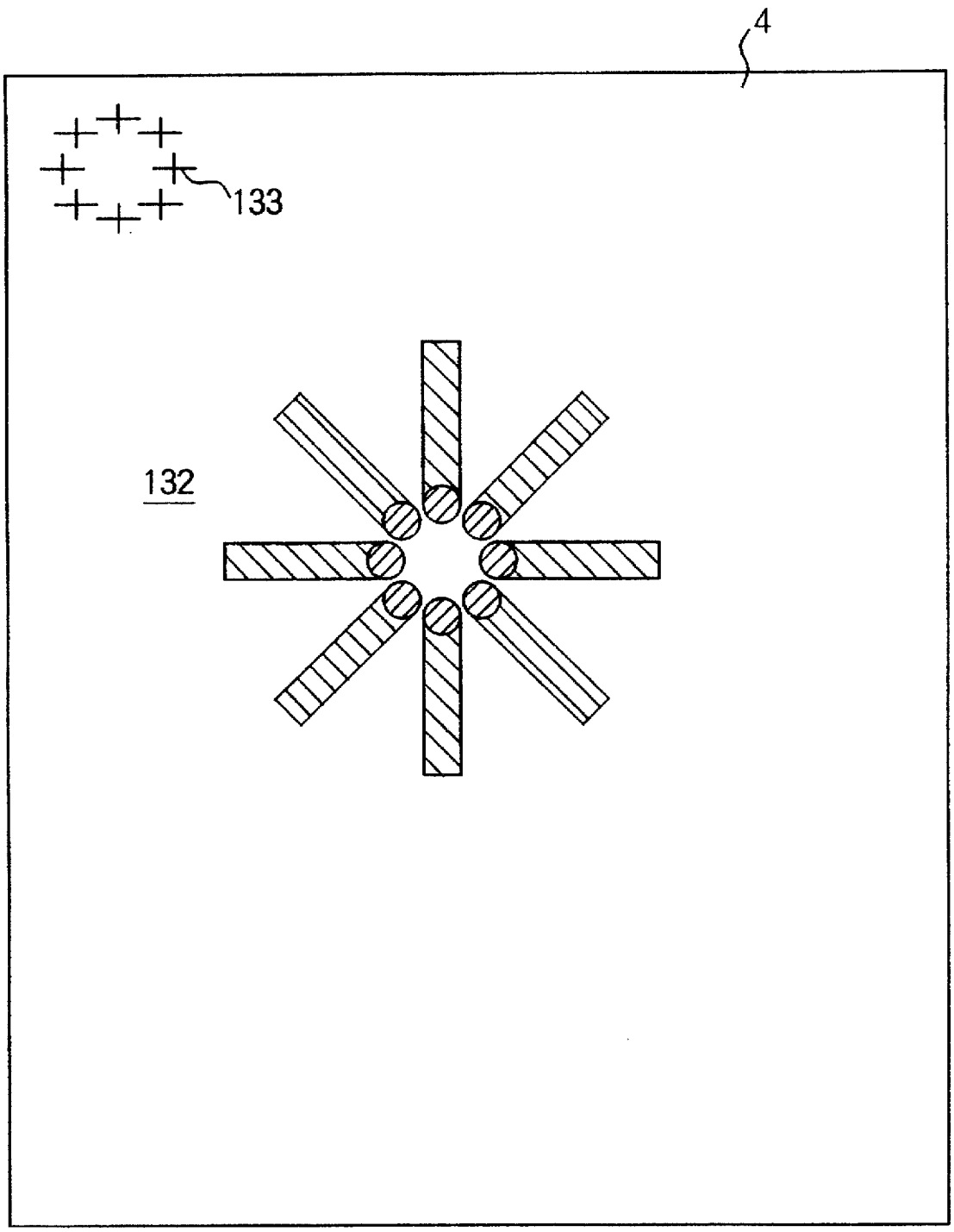
FIG. 19 is a diagram showing an embodiment directed to positioning of the probe in the eighth embodiment.

FIG. 19 shows a structure having probe assemblies 132 and a positioning mark 133 which are arranged on a movable electrode 4. The positioning mark 133 is adapted to detect the position of each probe assembly 132 on the movable electrode 4. In particular, the position of the movable electrode 4 is detected accurately through, for example, optical detection by a microscope or electronic detection using an electron beam to permit positioning of the probe assembly relative to a specimen. In an alternative, the positioning mark 133 may be provided on the side of a specimen (not shown) and the position of the probe assembly 132 can be detected by the probe thereof.

According to this method, the position can be detected directly by the probe to increase accuracy of positioning but contrarily, the ability to detect the position is degraded. Therefore, the use of the two methods is the most effective.

In the embodiments shown in FIGS. 18 and 19, the eight probe assemblies each having the probe are arranged radially and eight probes 124 excepting one are applied with voltage so as to be deflected upwards, taking the position as shown in FIG. 18B, so that measurement and operation can be carried out using the one probe which is not deflected. Obviously, the arrangement of the probe assemblies is not necessarily radial but the relative position between probes must be known accurately.

In the event that a probe in use is damaged, voltage is applied to the support cantilever of the damaged probe in order that the usable state is changed to the unusable state and on the other hand, voltage which has been applied to the support cantilever 123 of a different probe is interrupted to place this probe in usable condition, thus completing exchange of probe.

Figure 20A:
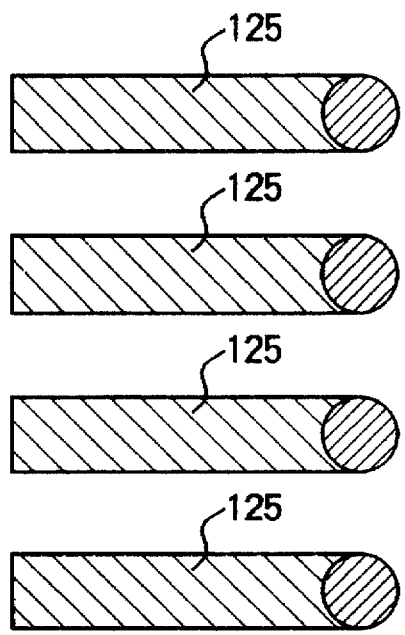
FIG. 20A is a diagram showing an ninth embodiment according to the present invention directed to electromagnetic deformation of part or the whole of a probe.

FIG. 20A shows an embodiment of a probe assembly group in which probe assemblies 125 are arranged in parallel. As described previously, when voltage is applied across a movable electrode 4 and a probe support cantilever 123 in a probe assembly 125, a usable probe support cantilever 123 of a usable probe assembly 125 of the probe assembly group can be selected. In the event that a probe in use is damaged, voltage is applied to the support cantilever of the damaged probe to bring the damaged probe from the usable state into the unusable state and on the other hand, voltage applied to the probe support cantilever 123 of another probe is interrupted to place this probe in usable condition, thereby completing exchange of probe.

Figure 20B:
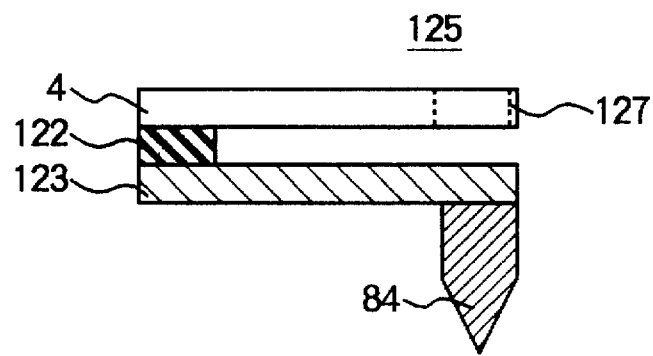
FIGS. 20B and 20C are diagrams showing an embodiment directed to an application to an optical leverage.
Figure 20C:
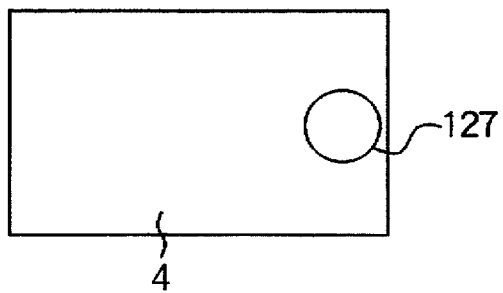

FIGS. 20B and 20C illustrate an embodiment in which a probe assembly 125 is applied to an optical leverage, showing a sectional view of the probe assembly 125 and a plan view corresponding to the sectional view, respectively. A light beam such as a laser beam is irradiated on the upper surface of a cantilever 123 through a hole 127 formed in a movable electrode 4 to ensure that deflection of a probe 124 can be measured. In the present embodiment, the hole 127 is exemplified as being formed vertically but a hole having an inclined form or a curry form may suffice provided that light can be irradiated on the top of the cantilever 123 and reflected light can be picked up.

What is claimed is:

1. A scanning probe microscope comprising:

a movable electrode supported at at least two points;

stationary electrodes so placed as to be adjacent to at least part of said movable electrode so that said movable electrode is moveable by an electrostatic force exerted between said movable electrode and the stationary electrodes;

a plurality of probes provided on said movable electrode at predetermined positions and at predetermined postures such that each probe of said plurality of probes can be alternatively selected as an operative probe; and means for controlling a level of said electrostatic force so as to control movement of said movable electrode;

wherein said each probe of said plurality of probes has a probe tip approachable to a surface of a specimen for measuring, and a support structure having a breakable structure so as to support said probe tip while said breakable structure is maintained intact and to allow a damaged said probe tip to be removed when said breakable structure is broken; and wherein only one of said plurality of probes being used for measuring at a given time.

2. A scanning probe microscope as claimed in claim 1, further comprising;
a three dimensional control unit provided on sand support structure to which said stationary electrode is provided, wherein, said movable electrode is controlled by said control unit.

3. A scanning probe microscope as claimed in claim 1, wherein said plurality of probes are provided in a stacked arrangement such that when a damaged said probe tip is removed by a breaking of said breakable structure corresponding thereto, a next probe tip in said stacked arrangement is exposed for use as said operative probe.

4. A scanning probe microscope as claimed in claim 1, wherein removal of said probe tip is realized by one of mechanical removal and deformation.

5. A scanning probe microscope as claimed in claim 1, wherein said plurality of probes are provided adjacent to one another and have mutually differing heights, such that when a damaged said probe tip is removed by a breaking of said breakable structure corresponding thereto, a next probe tip having a different height from a height of the removed said probe tip is arranged for use as said operative probe.

6. A scanning probe microscope comprising:
a plurality of assemblies, each of which comprises a movable electrode supported at at least two points, stationary electrodes so placed as to be adjacent to at least part of said movable electrode so that said movable electrode is moved by an electrostatic force exerted between said movable electrode and said stationary electrodes, and a plurality of probes provided on said movable electrode at predetermined positions and at predetermined postures such that each probe of said plurality probes can be alternatively selected as an operative robe; and
a control unit for controlling a level of said electrostatic force so that an amount of movement of said movable electrode of each assembly is independently controlled;
wherein said each probe of said plurality of probes has a probe tip approachable to a surface of a specimen for measuring, and a support structure having a breakable structure so as to support said probe tip while said breakable structure is maintained intact and allow a damaged said probe tip to be removed when said breakable structure is broken; and
wherein only one of said plurality of probes being used for measuring at a given time.

7. A scanning probe microscope as claimed in claim 6, wherein said plurality of probes are provided in a stacked arrangement such that when a damaged said probe tip is removed by a breaking of said breakable structure corresponding thereto, a next probe tip in said stacked arrangement is exposed for use as said operative probe.

8. A scanning probe microscope as claimed in claim 6, wherein said plurality of probes are provided adjacent to one another and have mutually differing heights, such that when a damaged said probe tip is removed by a breaking of said breakable structure corresponding thereto, a next probe tip having a different height from a height of the removed said probe tip is arranged for use as said operative probe.

9. scanning probe microscope comprising:
a movable electrode supported at at least two points;
stationary electrodes so placed as to be adjacent to at least part of said movable electrode so that said movable electrode is moved by an electrostatic force exerted between said movable electrode and said stationary electrodes;
a plurality of probes provided on said movable electrode at predetermined positions and at predetermined postures such that each probe of said plurality of probes can be alternatively selected as an operative probe; and
means for controlling a level of said electrostatic force so as to control movement of said movable electrode,
wherein said each probe of said plurality of probes has a probe tip approachable to a surface of a specimen for measuring, and a support structure in the form of a deformable conductor such that said each probe can be selected into an operative probe position by one of a deformation and non-deformation of said deformable conductor; and
wherein, only one probe of said plurality of probes being used for measuring at a given time and other probes being removed from said operative probe position at said time.

* * * * *